US007440425B2

(12) United States Patent
Rajkotia et al.

(10) Patent No.: US 7,440,425 B2
(45) Date of Patent: Oct. 21, 2008

(54) APPARATUS AND METHOD FOR REDUCING PAGING CHANNEL LOADING FOR BROADCAST MULTICAST SERVICES IN A WIRELESS NETWORK

(75) Inventors: Purva R. Rajkotia, Plano, TX (US); Chanakya Bandyopadhyay, Richardson, TX (US); Sanjaykumar Kodali, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 768 days.

(21) Appl. No.: 10/899,566

(22) Filed: Jul. 27, 2004

(65) Prior Publication Data

US 2005/0053023 A1 Mar. 10, 2005

Related U.S. Application Data

(60) Provisional application No. 60/500,160, filed on Sep. 4, 2003.

(51) Int. Cl.
*H04J 15/00* (2006.01)
(52) U.S. Cl. .................. 370/312; 455/458; 455/503
(58) Field of Classification Search ............. 455/412.1, 455/503, 422.1
See application file for complete search history.

(56) References Cited

U.S. PATENT DOCUMENTS 6,687,901 B1 * 2/2004 Imamatsu .................. 717/173
2003/0134622 A1 * 7/2003 Hsu et al. ................... 455/414

* cited by examiner

*Primary Examiner*—Temica Beamer (57) ABSTRACT

A message transmitted from a base station to a plurality of mobile stations in a wireless network providing broadcast multicast services includes one or more fields providing configuration information associated with multicast services deployed on each frequency in the coverage area of the base station and a flag indicating whether the message includes all of the one or more fields or only select ones of the one or more fields having updated configuration information.

30 Claims, 6 Drawing Sheets

| FIELD | LENGTH (BITS) |
|---|---|
| 501 — PILOT_PN | 9 |
| 502 — CONFIG_MSG_SEQ | 6 |
| 503 — AUTO_REQ_ALLOWED_IND | 1 |
| 504 — CLEAR_OLD_RECORD | 1 |
| 505 — NUM_FBSCH | 3 |
| 506 — NUM_BCMCS_SESSION | 3 |

NUM_FBSCH OCCURRENCES OF THE FOLLOWING RECORD:

| FIELD | LENGTH (BITS) |
|---|---|
| 507 — FBSCH_RECORD_LEN | 8 |
| 508 — FBSCH_RECORD_ID | 3 |
| ... | ... |

NUM_BCMCS_SESSION OCCURRENCES OF THE FOLLOWING VARIABLE LENGTH RECORDS:

| FIELD | LENGTH (BITS) |
|---|---|
| 509 — BCMCS_FLOW_ID_LEN_IND | 2 |
| 510 — BCMCS_FLOW_ID | 16, 24, OR 31 |
| ... | ... |

APPARATUS AND METHOD FOR REDUCING PAGING CHANNEL LOADING FOR BROADCAST MULTICAST SERVICES IN A WIRELESS NETWORK

CROSS-REFERENCE TO RELATED APPLICATION AND CLAIM OF PRIORITY

The present invention is related to that disclosed in U.S. Provisional Patent Application Ser. No. 60/500,160, filed Sep. 4, 2003, entitled "Technique to Reduce the Loading on Paging Channel for BCMCS". U.S. Provisional Patent Application Ser. No. 60/500,160 is assigned to the assignee of the present application. The subject matter disclosed in U.S. Provisional Patent Application Ser. No. 60/500,160 is hereby incorporated by reference into the present disclosure as if fully set forth herein. The present invention hereby claims priority under 35 U.S.C. §119(e) to U.S. Provisional Patent Application Ser. No. 60/500,160.

TECHNICAL FIELD OF THE INVENTION

The present invention relates generally to wireless networks and, more specifically, to an apparatus and method for reducing the loading on the paging channel for broadcast multicast services (BCMCS) in a wireless network.

BACKGROUND OF THE INVENTION

Early code division multiple access (CDMA) networks, such as IS-95 networks, carried only a very small amount of data traffic. However, third generation wireless networks, such as IS-2000 (also called CDMA2000), are designed to carry much heavier loads of data traffic. IS-2000 networks are capable of efficiently providing both high-speed data services and voice traffic. Still other networks, such as 1xEV-DO networks, are primarily data systems. These types of networks, if used for both voice and data, typically carry voice on an adjacent channel to data traffic. However, IS-2000 networks (i.e., Release C of CDMA2000) carry voice and data on the same carrier.

BCMCS (Broadcast Multicast Service) is one type of new data service that wireless providers are implementing in third generation wireless networks, including IS-2000 networks. The BCMCS is expected to become a very prominent feature for the next release of wireless standards. In a multicast data broadcast, the same data content (e.g., sports scores, weather reports, news, and the like) is transmitted to all (or at least a plurality) of the wireless terminals (or mobile stations) in the coverage area of a wireless network base station. The network operator can control each multicast data transmission with regard to accounting aspects, regions of the network where the multicast data transmissions are available to various users and the encryption of the multicast data transmissions to protect against unauthorized reception.

A user can discover the BCMCS services provided by the serving network in a variety of ways, including receiving the information on the overhead channel (e.g., BSPM—Broadcast Service Parameters Message) from the network. The BSPM overhead message carries the configuration of all of the BCMC services deployed on each frequency in a particular cell, along with the configuration of the BCMC services offered in neighboring cells. With the increase in the number of BCMC services being offered, the BSPM may become a considerably long message. In addition, the current IS-2000 standard requires that the BSPM be transmitted at least every 1.28 seconds. As a result of the length of the message in conjunction with the frequency of transmission, the BSPM has the potential to significantly increase the loading on the paging (overhead) channel.

In addition, when the mobile station initially updates the overhead information, lengthy broadcast service parameters messages may cause a delay of up to five seconds to update the BSPM information. Furthermore, in many cases, the same redundant information is sent on the BSPM every 1.28 seconds, causing unnecessary paging channel loading and unnecessary processing of the same message by the mobile station.

Therefore, there is a need in the art for systems and methods of limiting the paging loading capacity and avoiding the unnecessary processing of the BSPM by mobile stations in a wireless network. In particular, there is a need for a technique to reduce the overhead needed to transmit updated information in the BSPM.

SUMMARY OF THE INVENTION

The present invention introduces a flag within the broadcast service parameters message (BSPM) to indicate whether a portion or all of the configuration information fields are included in the BSPM. If the flag is set to a first value (e.g., logic "0"), the BSPM includes only the fields for which the configuration information has changed from the previous BSPM. If the flag is set to a second value (e.g., logic "1"), the BSPM contains all of the configuration information fields.

To address the above-discussed deficiencies of the prior art, it is a primary object of the present invention to provide, for use in a wireless network, a mobile station capable of receiving multicast data transmissions broadcast in a coverage area of a base station. According to an advantageous embodiment of the present invention, the mobile station comprises: (i) a transceiver capable of receiving a broadcast service parameters message from the base station, in which the broadcast service parameters message is capable of providing information to the mobile station in one or more fields; (ii) a memory capable of storing the information sent in the fields of the broadcast service parameters message; and (iii) a processor capable of reading a value of a flag within the broadcast service parameters message and overwriting in the memory the information associated with select ones of the fields based on the value of the flag.

According to one embodiment of the present invention, the broadcast service parameters message includes only the select fields having updated information, and the processor is further capable of overwriting the information associated with the select fields with the updated information and maintaining the information associated with other ones of the fields in the memory when the flag is set to a first value.

According to another embodiment of the present invention, the broadcast service parameters message further includes a message sequence field indicating a number of the broadcast service parameters message in a sequence of broadcast service parameters messages. The message sequence field is incremented when the broadcast service parameters message includes the updated information.

According to still another embodiment of the present invention, the select fields included in the broadcast service parameters message include all of the fields when the flag is set to a second value.

According to yet another embodiment of the present invention, the information is configuration information associated with multicast services deployed on each frequency in the coverage area of the base station. The information may also further include configuration information associated with multicast services deployed on each frequency in a coverage area of at least one neighboring base station.

According to a further advantageous embodiment of the present invention, a base station capable of broadcasting multicast data transmissions to a plurality of mobile stations comprises: (i) a transceiver capable of transmitting a broadcast service parameters message to the plurality of mobile stations, in which the broadcast service parameters message includes a flag and is capable of providing information to the plurality of mobile stations in one or more fields; and (ii) a controller capable of setting a value of the flag and including only select ones of the one or more fields in the broadcast service parameters message based on the value of the flag.

According to still another embodiment of the present invention, the broadcast service parameters message is transmitted at least every 1.28 seconds.

According to a still further embodiment of the present invention, the broadcast service parameters message is transmitted on a paging channel.

According to yet a further embodiment of the present invention, the controller is further capable of setting the value of the flag based on a number of new broadcast multicast service registrations by the mobile stations recorded since the transmission of a previous broadcast service parameters message.

According to an additional embodiment of the present invention, the controller is further capable of setting the value of the flag based on a timer. The flag is set to a first value upon initialization of the timer and to a second value upon expiration of the timer.

According to a still additional embodiment of the present invention, the controller is further capable of setting the value of the flag based on an amount of updated information received by the base station since the transmission of a previous broadcast service parameters message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
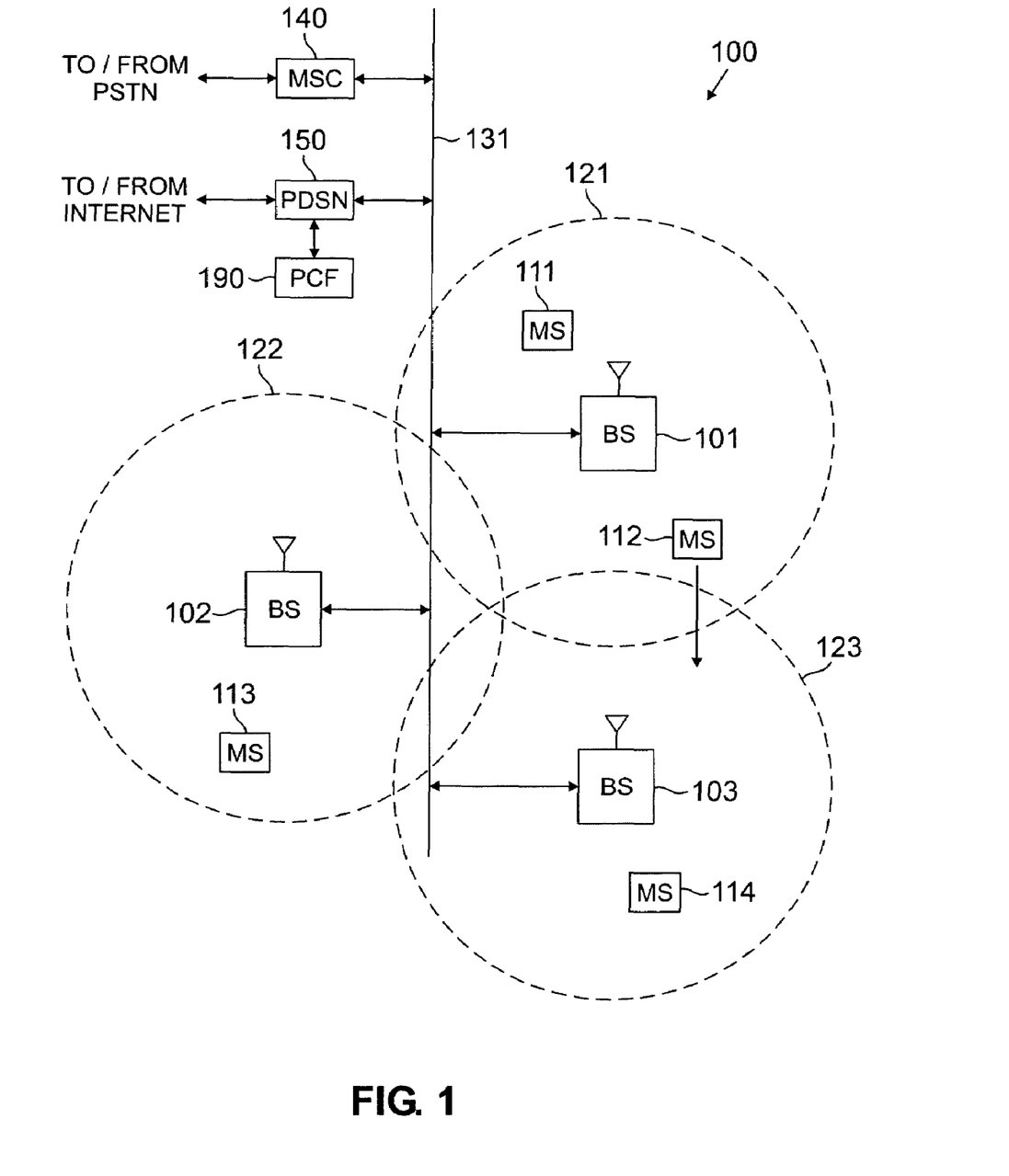
FIG. 1 illustrates an exemplary wireless network that deploys broadcast-multicast services (BCMCS) in an efficient manner according to the principles of the present invention.

FIG. 1 illustrates exemplary wireless network 100, which deploys broadcast-multicast services (BCMCS) in an efficient manner according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000-C standard (i.e., Release C of cdma2000) Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102 or BS 103 to MSC 140.

In the embodiment of wireless network 100 shown in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a "soft" handoff or a "hard" handoff. In a soft handoff, a connection is made between the mobile station and the base station in the second cell before the existing connection is broken between the mobile station and the base station in the first cell. In a hard handoff, the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft handoff assumes the mobile station is in a voice or data call. An idle handoff is the hand-off between cell sites of a mobile station that is communicating in the control or paging channel.

According to the principles of the present invention, the mobile stations operating in wireless network 100 are capable of receiving multicast data transmissions broadcast on shared traffic channels. For example, in an IS-2000 embodiment, each of BS 111-113 may transmit, and each of MS 111-114 may receive, multicast data transmissions in a Forward Packet Data Channel (F-PDCH) or a Forward Supplemental Channel (F-SCH), or both.

Figure 2:
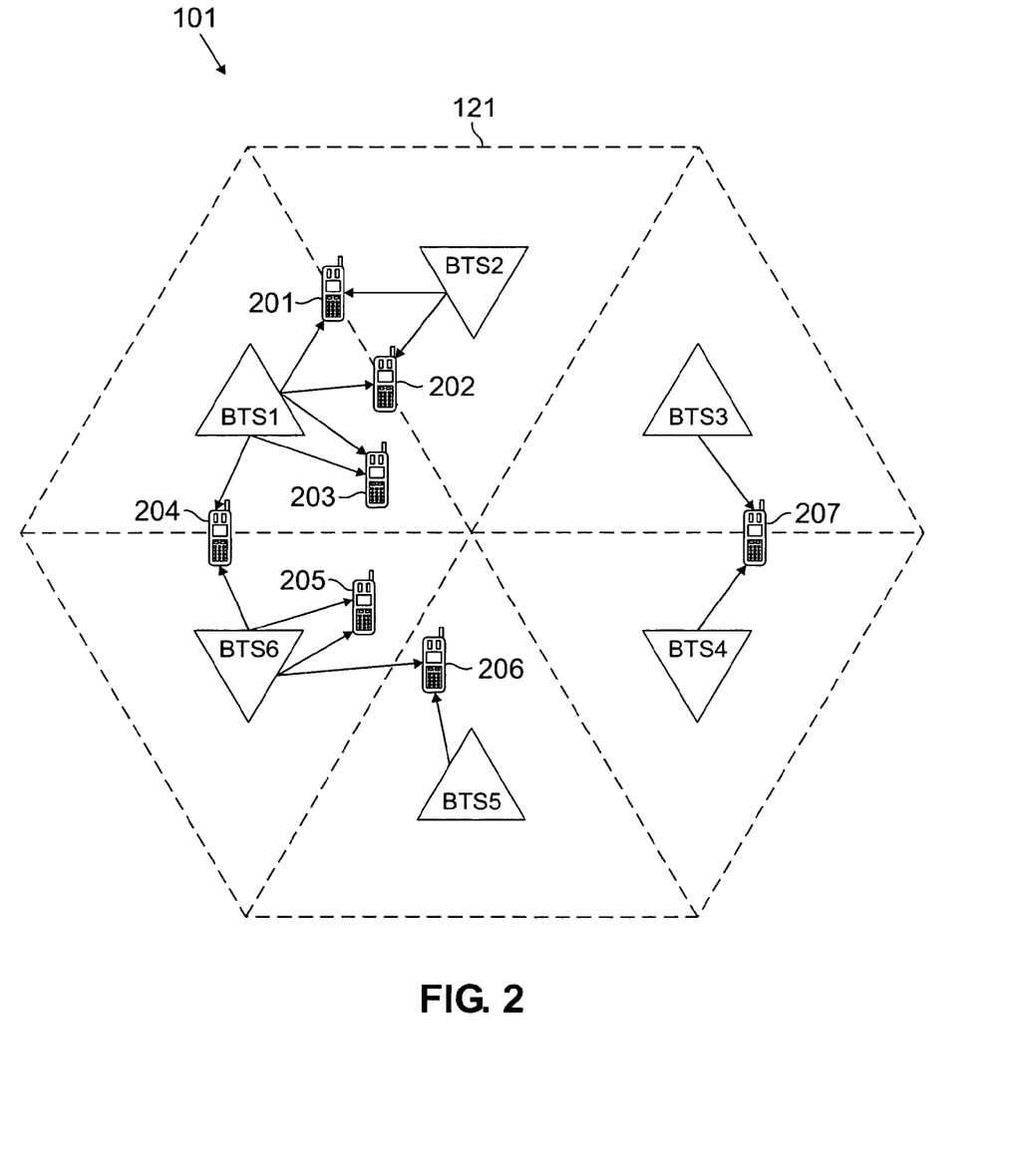
FIG. 2 illustrates multicast data transmissions to a plurality of mobile stations in the wireless network in FIG. 1 according to one embodiment of the present invention.

FIG. 2 illustrates multicast data transmissions to a plurality of mobile stations in wireless network 100 according to one embodiment of the present invention. Base station 101 is shown in greater detail. Base station 101 comprises six base transceiver subsystems, labeled BTS1, BTS2, BTS3, BTS4, BTS5 and BTS6. Cell site 121 of base station 101 is shown as a hexagonal shape (rather than a circle, as in FIG. 1) for the purposes of illustration and explanation only. Each base transceiver subsystem (BTS) uses a three-sector antenna, where each of the three sectors (sector $\alpha$, sector $\beta$, sector $\gamma$) covers 120 degrees of arc. The coverage area of each BTS is shown as a triangle. The six triangles form the hexagonal coverage area of base station 101.

In FIG. 2, three exemplary multicast data streams (transmissions) are broadcasted. One sector of BTS2 broadcasts a first multicast data transmission to mobile stations 201 and 202. One sector of BTS1 also broadcasts the same first multicast data transmission to mobile stations 201 and 202. Two different sectors of BTS1 broadcast the first multicast data transmission to mobile station 203. Finally, one sector of BTS1 and one sector of BTS6 broadcast the first multicast data transmission to mobile station 204.

Two different sectors of BTS6 broadcast a second multicast data transmission to mobile station 205. One sector of BTS6 broadcasts the second multicast data transmission to mobile station 206. Finally, one sector of BTS5 also broadcasts the second multicast data transmission to mobile station 206.

One sector of BTS3 broadcasts a third multicast data transmission to mobile station 207. Finally, one sector of BTS4 also broadcasts the third multicast data transmission to mobile station 207.

Since BTS1-BTS6 are broadcasting the first, second and third multicast data transmissions using a shared traffic channel, at least some of mobile stations 201-207 receive the multicast data transmissions from more than one BTS. This enhances mobile station reception and is similar to a handoff operation in which a CDMA mobile station receives forward channel signals from two or more base transceiver subsystems.

Each multicast data transmission corresponds to a particular broadcast multicast (BCMC) service provided by a content provider, such as CNN, HBO, NBC, etc. Each service has multiple BCMCS flows. For example, CNN may provide one flow for visual effects, a different flow for audio effects and a different flow for close-captioning. All of the flows can be either on the same traffic channel (or frequency) or on different traffic channels.

The configuration information necessary for each mobile station (e.g., mobile stations 201, 202, 203 and 204) to receive all of the flows for each BCMC service deployed on each frequency in a coverage area of a particular base transceiver station (e.g., BTS1) is broadcast to mobile stations 201, 202, 203 and 204 in a broadcast service parameters message (BSPM) on a paging (overhead) channel of BTS1. In addition, to handle autonomous handoffs, the BSPM may also include the configuration information for the BCMC services provided by neighboring base transceiver stations (e.g., at least BTS2 and BTS3).

Figure 3:
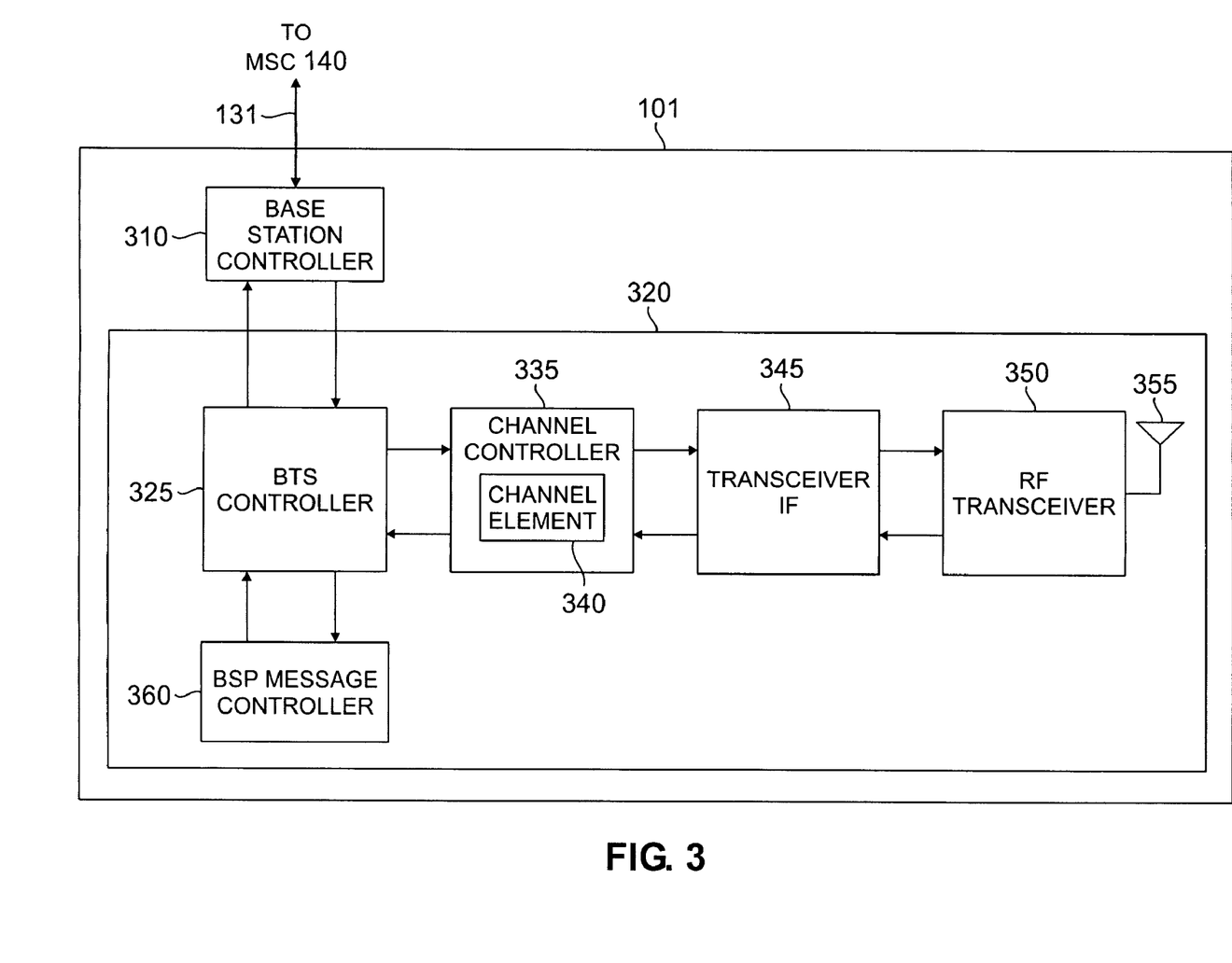
FIG. 3 illustrates in greater detail an exemplary base station according to one embodiment of the present invention.

FIG. 3 illustrates exemplary base station 101 in greater detail according to an exemplary embodiment of the present invention. Base station 101 comprises base station controller (BSC) 310 and base transceiver station (BTS) 320. Base station controllers and base transceiver stations were described previously in connection with FIGS. 1 and 2. BSC 310 manages the resources in cell site 121, including BTS 320. BTS 320 comprises BTS controller 325, channel controller 335 (which contains representative channel element 340), transceiver interface (IF) 345, RF transceiver unit 350, antenna array 355, and BSP (broadcast service parameter) message controller 360.

BTS controller 325 comprises processing circuitry and memory capable of executing an operating program that controls the overall operation of BTS 320 and communicates with BSC 310. Under normal conditions, BTS controller 325 directs the operation of channel controller 335, which contains a number of channel elements, including channel element 340, that perform bi-directional communications in the forward channel and the reverse channel. A "forward" channel refers to outbound signals from the base station to the mobile station and a "reverse" channel refers to inbound signals from the mobile station to the base station. Transceiver IF 345 transfers the bi-directional channel signals between channel controller 340 and RF transceiver unit 350.

Antenna array 355 transmits forward channel signals received from RF transceiver unit 350 to mobile stations in the coverage area of BS 101. Antenna array 355 also sends to transceiver 350 reverse channel signals received from mobile stations in the coverage area of BS 101. In a preferred embodiment of the present invention, antenna array 355 is multi-sector antenna, such as a three-sector antenna in which each antenna sector is responsible for transmitting and receiving in a 120° arc of coverage area. Additionally, transceiver 350 may contain an antenna selection unit to select among different antennas in antenna array 355 during both transmit and receive operations.

For example, in accordance with embodiments of the present invention, antenna array 355 is capable of transmitting, on a paging (overhead) channel, a broadcast service parameters message (BSPM) at least every 1.28 seconds. The broadcast service parameters message contains a flag and one or more fields for providing information to the mobile stations regarding the BCMC services deployed on each frequency in the coverage area of BTS 320. BSPM is constructed by BSP message controller 360 based on data collected by BSP message controller 360.

For example, in one embodiment, the data may include new, updated configuration information from one or more content providers, BSC 310, MSC 140, other network device or a network operator. If the amount of new, updated configuration information exceeds a threshold greater than or equal to zero, BSP message controller 360 sets the flag to a first value indicating that the BSPM includes all of the fields to enable the mobile stations to receive all of the configuration information necessary to utilize the BCMC service. Otherwise, BSP message controller 360 sets the flag to a second value, and includes only those fields for which new, updated information has been received since the transmission of the previous BSPM.

In other embodiments, the data collected by BSP message controller 360 may include any type of data used by BSP message controller 360 in setting the value of the flag. For example, in one embodiment, BSP message controller 360 records the number of new broadcast multicast (BCMC) service registrations made by mobile stations since the transmission of a previous broadcast service parameters message, and uses this information to set the value of the flag. If the number of new BCMC service registrations exceeds a threshold greater than or equal to zero, BSP message controller 360 sets the flag to a first value indicating that the BSPM includes all of the fields to enable the newly registered mobile stations to receive all of the configuration information necessary to utilize the BCMC service. Otherwise, BSP message controller 360 sets the flag to a second value, and includes only those fields for which new, updated information has been received since the transmission of the previous BSPM.

As another example, in another embodiment, BSP message controller 360 initializes a timer, and uses the value of the timer to set the value of the flag. Upon expiration of the timer, BSP message controller 360 sets the flag to a first value indicating that the BSPM includes all of the fields to enable the mobile stations to periodically receive all of the configuration information necessary to utilize the BCMC service. Otherwise, if the timer has not yet expired, BSP message controller 360 sets the flag to a second value, and includes only those fields for which new, updated information has been received since the transmission of the previous BSPM.

BSP message controller 360 is further capable of setting the value of a message sequence field in the BSPM that identifies the sequential number of the BSPM in a stream of BSPMs. For example, if the BSPM includes at least one field having new, updated configuration information, BSP message controller 360 increments the message sequence field in the BSPM from a previous value of the message sequence field in a previous BSPM. However, if no new configuration information is included in the BSPM, BSP message controller 360 does not increment the message sequence field.

Figure 4:
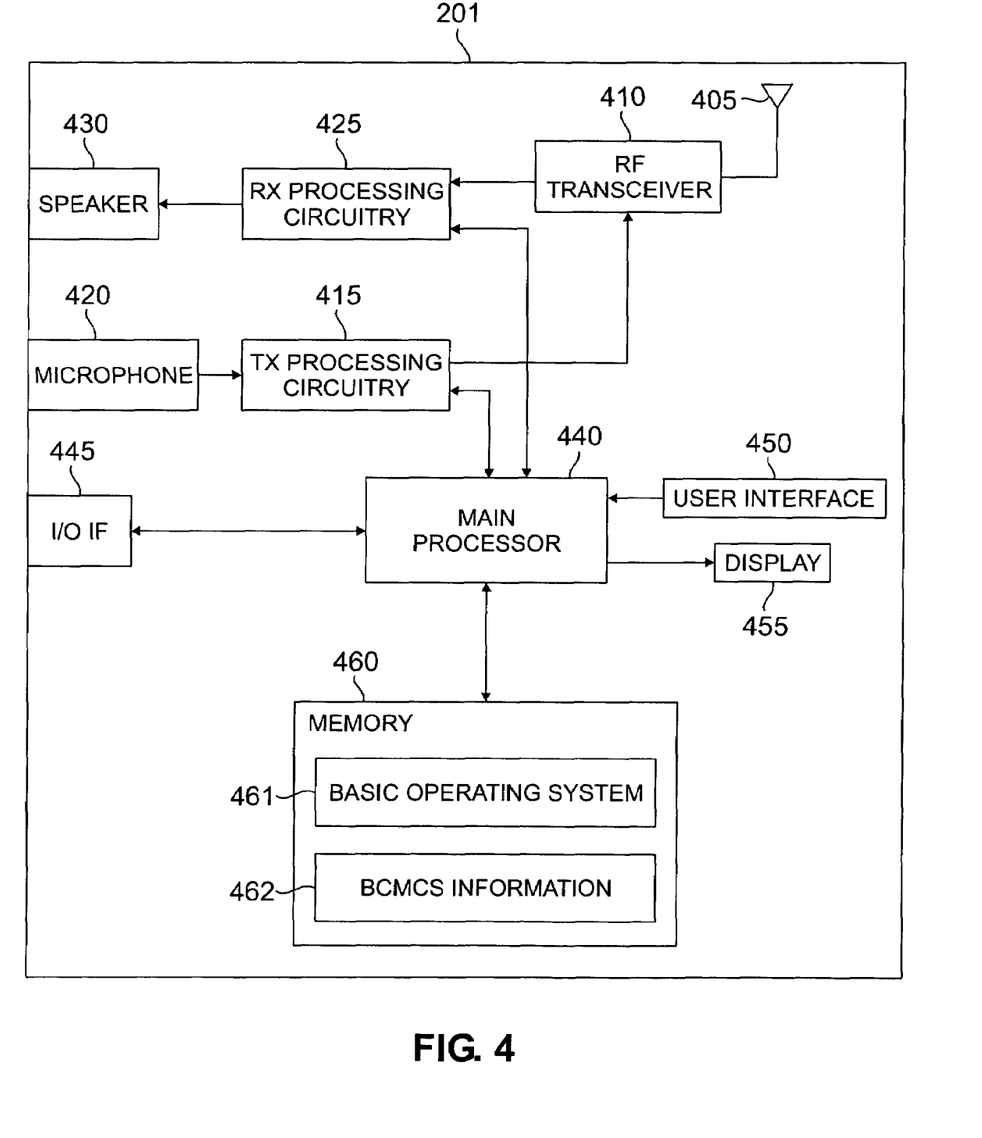
FIG. 4 illustrates in greater detail an exemplary mobile station according to one embodiment of the present invention.

FIG. 4 illustrates wireless mobile station 201 according to an advantageous embodiment of the present invention. Wireless mobile station 201 comprises antenna 405, radio frequency (RF) transceiver 410, transmit (TX) processing circuitry 415, microphone 420, and receive (RX) processing circuitry 425. MS 201 also comprises speaker 430, main processor 440, input/output (I/O) interface (IF) 445, user interface 450, display 455, and memory 460. Memory 460 further comprises basic operating system 461 and BCMCS (broadcast multicast service) configuration information 462.

Radio frequency (RF) transceiver 410 receives from antenna 405 an incoming multicast data transmission (RF signal) broadcasted by a base station of wireless network 100. Radio frequency (RF) transceiver 410 down-converts the incoming signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In an advantageous embodiment of the present invention, main processor 440 is a microprocessor or microcontroller. Memory 460 is coupled to main processor 440. According to an advantageous embodiment of the present invention, part of memory 460 comprises a random access memory (RAM) and another part of memory 460 comprises a Flash memory, which acts as a read-only memory (ROM).

Main processor 440 executes basic operating system (OS) program 461 stored in memory 460 in order to control the overall operation of wireless mobile station 201. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460. Main processor 440 can move data into or out of memory 460, as required by an executing process. Main processor 440 is also coupled to I/O interface 445. I/O interface 445 provides mobile station 201 with the ability to connect to other devices such as laptop computers and handheld computers. I/O interface 445 is the communication path between these accessories and main processor 440.

Main processor 440 is also coupled to user interface 450 and display unit 455. User interface 450 may be a keypad, touchpad or other type of user interface device. Display 455 may be a liquid crystal display capable of rendering text and/or at least limited graphics from web sites. Alternate embodiments may use other types of displays.

Main processor 440 is further capable of receiving a BSPM (broadcast service parameters message) via RF transceiver 410 and processing the BSPM based on the contents of the BSPM. In accordance with embodiments of the present invention, the BSPM contains a flag and one or more fields containing information regarding the BCMC services deployed on each frequency in the coverage area of a serving and zero or more neighboring base stations.

For example, in one embodiment, the flag may be set to a first value indicating that the current BSPM includes all of the fields of the BSPM. If the flag is set to the first value (e.g., "0"), main processor 440 retrieves the BCMCS configuration information from the current BSPM and overwrites the existing BCMCS configuration information 462 stored in memory 460. In another embodiment, the flag may be set to a second value indicating that the current BSPM includes only select fields having new, updated information since the reception of the previous BSPM. If the flag is set to the second value (e.g., "1"), main processor 440 retrieves the updated information from the current BSPM and overwrites the existing BCMCS configuration information 462 associated with the select fields. BCMCS configuration information 462 associated with other fields not included within the current BSPM is maintained in memory 460 without modification.

Another one of the fields may be a message sequence field identifying the sequential number of the BSPM in a stream of BSPMs. For example, if BSPM includes at least one field having new, updated configuration information, the message sequence field may be incremented from a previous value in a previously received BSPM. When the message sequence field is incremented, main processor 440 is capable of recognizing that new information is included in the BSPM and processes the BSPM, as discussed above. However, if no new information is included in the BSPM, and therefore, the message sequence field is not incremented, main processor 440 is further capable of recognizing that no new information is included and ignores or discards the BSPM without further processing.

Figure 5:
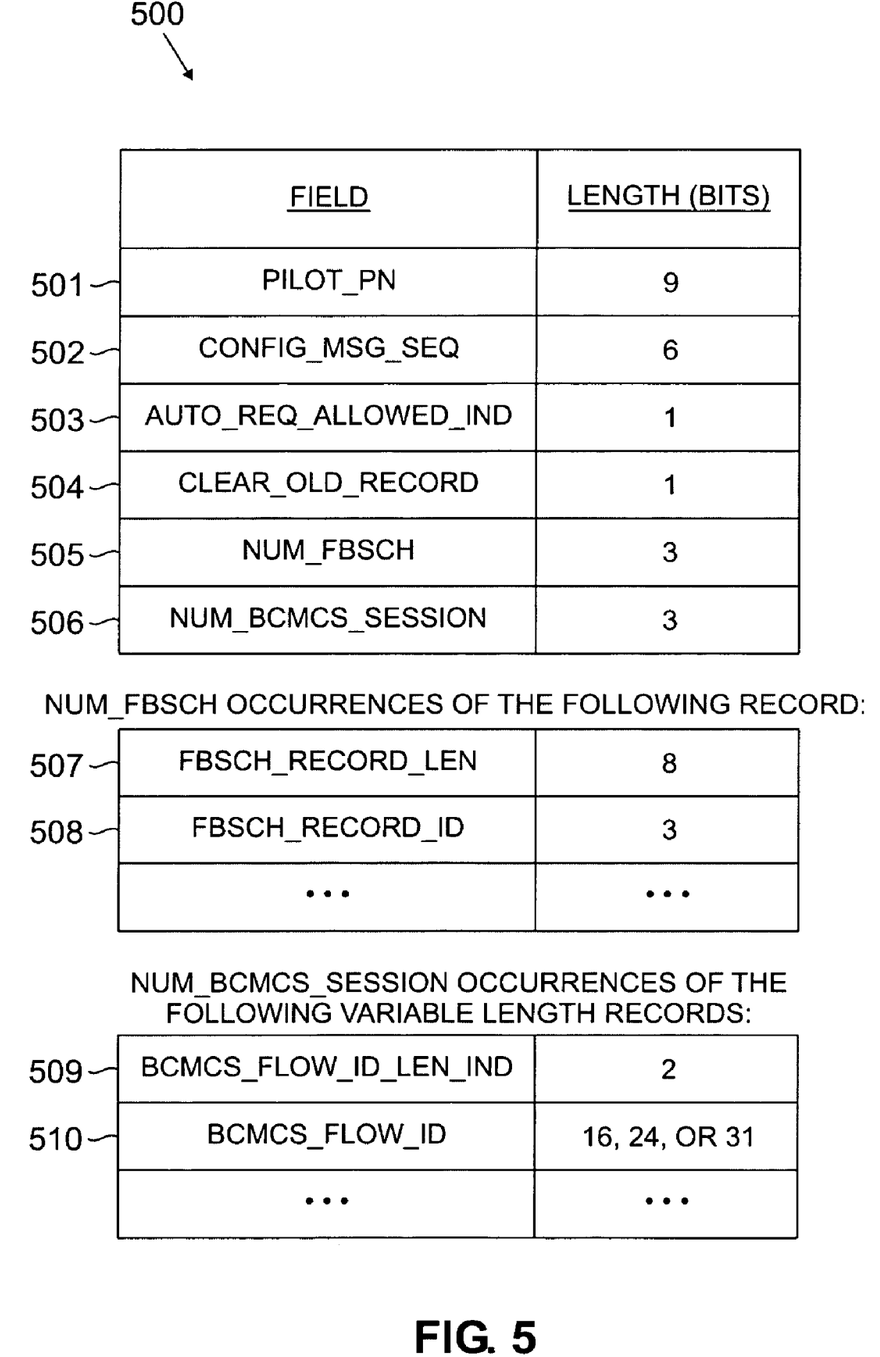
FIG. 5 illustrates an exemplary Broadcast Service Parameters message according to one embodiment of the present invention.

FIG. 5 illustrates an exemplary message 500 according to one embodiment of the present invention. Message 500 shown in FIG. 5 is a broadcast service parameters message (BSPM) typically broadcast by base stations to mobile stations within a coverage area of the base station on a paging (overhead) channel. BSPM 500 has been modified to include a flag for indicating whether the BSPM includes all of the fields or only select fields for which new, updated information is included.

BSPM 500 comprises, in addition to other fields known in the art (not shown for simplicity), PILOT_PN field 501, CONFIG_MSG_SEQ field 502, AUTO_REQ_ALLOWED_IND field 503, CLEAR_OLD_RECORD field 504, NUM_FBSCH field 505, NUM_BCMCS_SESSION field 506, FBSCH_RECORD_LEN field 507, FBSCH_RECORD_ID field 508, BCMCS_FLOW_ID_LEN_ID field 509 and BCMCS_FLOW_ID field 510. PILOT_PN field 501 has a length of nine bits and identifies message 500 as an overhead (paging) channel BSP message.

CONFIG_MSG_SEQ field 502 has a length of six bits and identifies the sequential number of the BSP message in a stream of BSP messages. For example, if BSP message 500 includes at least one forward broadcast supplemental channel (FBSCH) field or BCMC service flow field, indicating that new, updated configuration information is included in BSP message 500, CONFIG_MSG_SEQ field 502 is incremented from a previous value of CONFIG_MSG_SEQ field 502 in a previous BSP message 500. When CONFIG_MSG_SEQ field 502 is incremented, the receiving mobile station recognizes that new information is included in BSP message 500 and processes BSP message 500 accordingly. However, if no new information is included in BSP message 500, and therefore, BSP message 500 does not include any FBSCH or BCMC service flow fields, CONFIG_MSG_SEQ field 502 is not incremented. When CONFIG_MSG_SEQ field 502 is not incremented, the receiving mobile station recognizes that no new information is included and ignores or discards BSP message 500.

AUTO_REQ_ALLOWED_IND field 503 has a length of one bit and indicates whether the BCMC services are automatically provided to the mobile stations in the coverage area of the base station. CLEAR_OLD_RECORD field 504 has a length of one bit and is the flag that indicates whether BSP message 500 includes all fields or only those fields for which new, updated information is provided. For example, if CLEAR_OLD_RECORD field 504 is set to a first value (e.g., logic "0"), BSP message 500 includes only the fields for which the information has changed from the previous BSPM. IF CLEAR_OLD_RECORD field 504 is set to logic "0" and CONFIG_MSG_SEQ field 502 is not incremented from the previous BSP message, BSP message 500 does not include any FBSCH or BCMC service flow fields. If CLEAR_OLD_RECORD field 504 is set to a second value (e.g., logic "1"), BSP message 500 contains all of the configuration information (FBSCH and BCMC service flow) fields.

NUM_FBSCH field 505 has a length of three bits and is used to indicate the number of FBSCH fields included in BSP message 500. For example, if CLEAR_OLD_RECORD field 504 is set to logic "0", NUM_FBSCH field 505 is set to the number of FBSCH fields for which new, updated information is provided in BSP message 500. NUM_BCMCS_SESSION field 506 has a length of three bits and is used to indicate the number of BCMC service fields included in BSP message 500. For example, if CLEAR_OLD_RECORD field 504 is set to logic "0", NUM_BCMC_SESSION field 506 is set to the number of BCMC service flow fields for which new, updated information is provided in BSP message 500.

FBSCH_RECORD_LEN field 507 has a length of eight bits and is used to indicate the length of the FBSCH record for which configuration information is included in BSP message 500. FBSCH_RECORD_ID field 508 has a length of three bits and includes the identifier for the particular FBSCH record for which configuration information is provided. The configuration information is included in additional fields after FBSCH_RECORD_ID field 508. Fields 507, 508 and following fields are repeated for each FBSCH record indicated in NUM_FBSCH field 505.

BCMCS_FLOW_ID_LEN_IND field 509 has a length of two bits and is used to indicate the length of the identifier for the particular BCMC service flow for which configuration information is included in BSP message 500. BCMCS_FLOW_ID field 510 has a length of 16, 24 or 32 bits, as indicated in BCMCS_FLOW_ID_LEN_IND field 509. BCMCS_FLOW-ID field 510 includes the identifier for the particular BCMC service (content) flow for which configuration information is provided. The configuration information is included in additional fields after BCMC_FLOW_ID field 510. Fields 509, 510 and following fields are repeated for each BCMC service flow indicated in NUM_BCMCS¯SESSION field 506.

Figure 6:
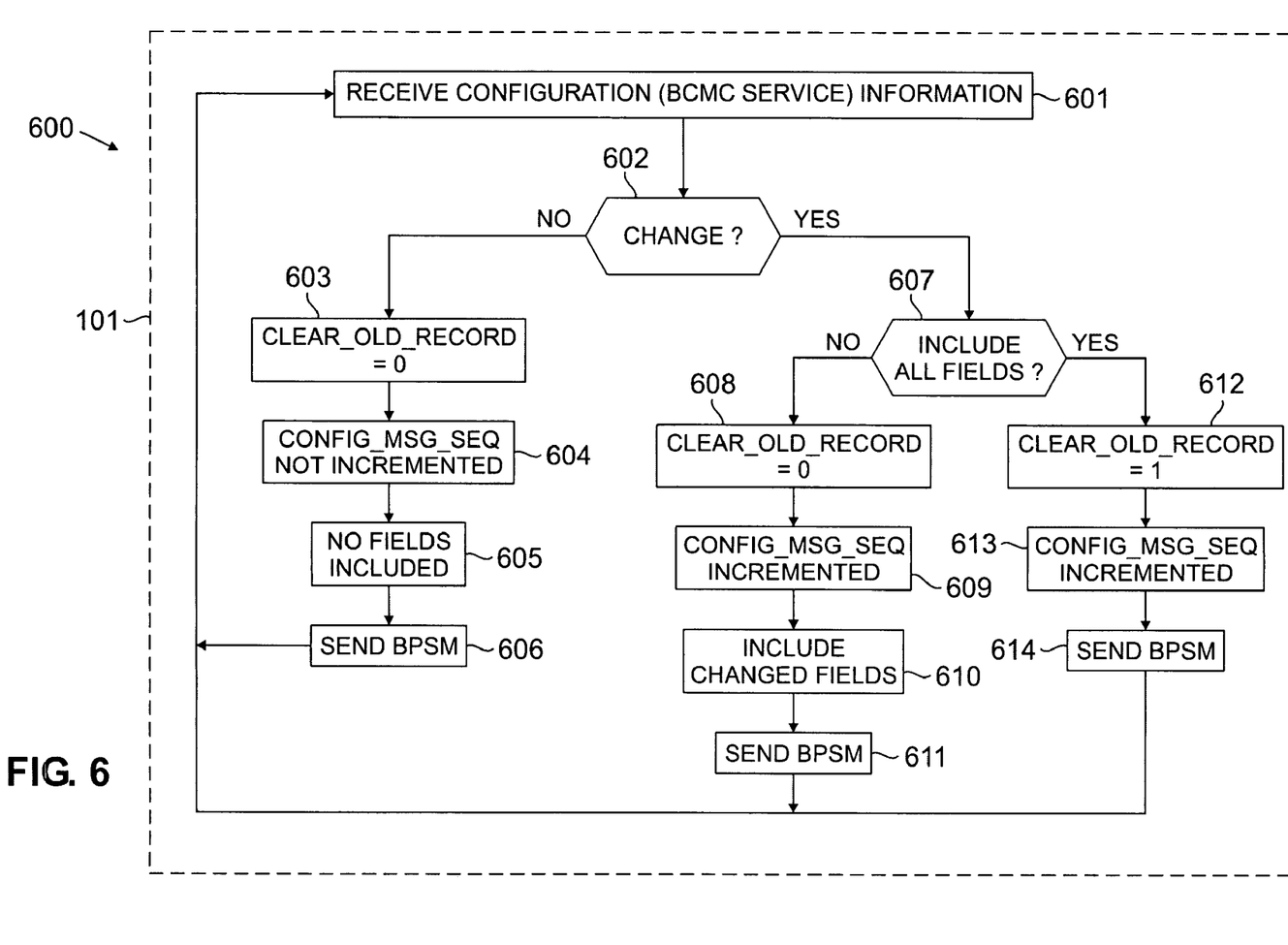
FIG. 6 is a flow diagram illustrating a Broadcast Service Parameters message sending operation according to the principles of the present invention.

FIG. 6 depicts flow diagram 600, which illustrates a Broadcast Service Parameters message (BSPM) sending operation performed by a base station (e.g., BS 101) according to the principles of the present invention. Initially, BS 101 receives configuration information for BCMC services deployed in a coverage area of BS 101 (process step 601). If the configuration information does not contain any new or updated information as compared to previously received configuration information (N branch of decision step 602), BS 101 sets the flag (CLEAR_OLD_RECORD field) for a current BSPM to a first value (e.g., logic "0") indicating that only select fields are included in the BSPM (process step 603). In addition, BS 101 does not increment the message sequence (CONFIG_MSG_SEQ) field (process step 604), indicating that the current BSPM does not include any configuration information fields (process step 605). Thereafter, BS 101 completes construction and formatting of the current BSPM and sends the current BSPM to mobile stations currently being served by BS 101 (process step 606).

If the configuration information does contain new or updated information as compared to previously received configuration information (Y branch of decision step 602), BS 101 determines whether to include only those fields for which information has changed or to include all of the fields in the current BSPM (decision step 607), using one of the methods described above in connection with FIG. 3. If BS 101 determines that only select fields are to be included in the current BSPM (N branch of decision step 607), BS 101 sets the flag (CLEAR_OLD_RECORD field) for the current BSPM to the first value (e.g., logic "0") indicating that only select fields are included in the BSPM (process step 608). In addition, BS 101 increments the message sequence (CONFIG_MSG_SEQ) field (process step 609), and includes the select fields for which the configuration information has changed in the current BSPM (process step 610). Thereafter, BS 101 completes construction and formatting of the current BSPM and sends the current BSPM to mobile stations currently being served by BS 101 (process step 611).

If BS 101 determines that all fields are to be included in the current BSPM (Y branch of decision step 607), BS 101 sets the flag (CLEAR_OLD_RECORD field) for the current BSPM to a second value (e.g., logic "1") indicating that all fields are included in the current BSPM (process step 612). In addition, BS 101 increments the message sequence (CONFIG_MSG_SEQ) field (process step 613). Thereafter, BS 101 completes construction and formatting of the current BSPM by including all of the configuration information fields and sends the current BSPM to mobile stations currently being served by BS 101 (process step 614). The process is repeated at least every 1.28 seconds.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a mobile station capable of receiving multicast data transmissions broadcast in a coverage area of a base station, said mobile station comprising:
   a transceiver capable of receiving a broadcast service parameters message from said base station, said broadcast service parameters message capable of providing information to said mobile station in one or more fields;
   a memory capable of storing said information sent in said fields of said broadcast service parameters message;
   a processor capable of reading a value of a flag within said broadcast service parameters message and overwriting in said memory said information associated with select ones of said fields based on said value of said flag; and
   wherein said broadcast service parameters message includes only said select fields having updated information and said processor is further capable of overwriting said information associated with said select fields with said updated information and maintaining said information associated with other ones of said fields in said memory when said flag is set to a first value.

2. The mobile station as set forth in claim 1 wherein broadcast service parameters message further includes a message sequence field indicating a number of said broadcast service parameters message in a sequence of broadcast service parameters messages, said message sequence field being incremented when said broadcast service parameters message includes said updated information.

3. The mobile station as set forth in claim 2 wherein said message sequence field is not incremented when said broadcast service parameters message does not include said updated information.

4. The mobile station as set forth in claim 1 wherein said select fields included in said broadcast service parameters message include all of said fields when said flag is set to a second value.

5. The mobile station as set forth in claim 1 wherein said information is configuration information associated with multicast services deployed on each frequency in said coverage area of said base station.

6. The mobile station as set forth in claim 5 wherein said information further includes configuration information associated with multicast services deployed on each frequency in a coverage area of at least one neighboring base station.

7. For use in a wireless network, a base station capable of broadcasting multicast data transmissions to a plurality of mobile stations, said base station comprising:
   a transceiver capable of transmitting a broadcast service parameters message to said plurality of mobile stations, said broadcast service parameters message including a flag and capable of providing information to said plurality of mobile stations in one or more fields; and
   a controller capable of setting a value of said flag and including only select ones of said one or more fields in said broadcast service parameters message based on said value of said flag, and wherein said broadcast service parameters message includes only said select fields having updated information when said flag is set to a first value.

8. The base station as set forth in claim 7 wherein broadcast service parameters message further includes a message sequence field indicating a number of said broadcast service parameters message in a sequence of broadcast service parameters messages, said message sequence field being incremented when said broadcast service parameters message includes said updated information.

9. The base station as set forth in claim 8 wherein said message sequence field is not incremented when said broadcast service parameters message does not include said updated information.

10. The base station as set forth in claim 7 wherein said select fields included in said broadcast service parameters message include all of said one or more fields when said flag is set to a second value.

11. The base station as set forth in claim 7 wherein said information is configuration information associated with multicast services deployed on each frequency in said coverage area of said base station.

12. The base station as set forth in claim 11 wherein said information further includes configuration information associated with multicast services deployed on each frequency in a coverage area of at least one neighboring base station.

13. The base station as set forth in claim 7 wherein said broadcast service parameters message is transmitted at least every 1.28 seconds.

14. The base station as set forth in claim 7, wherein broadcast service parameters message is transmitted on a paging channel.

15. The base station as set forth in claim 7, wherein said controller is further capable of setting said value of said flag based on a number of new broadcast multicast service registrations by said mobile stations recorded since the transmission of a previous broadcast service parameters message.

16. The base station as set forth in claim 7, wherein said controller is further capable of setting said value of said flag based on a timer, said flag being set to a first value upon initialization of said timer and to a second value upon expiration of said timer.

17. The base station as set forth in claim 7, wherein said controller is further capable of setting said value of said flag based on an amount of updated information received by said base station since the transmission of a previous broadcast service parameters message.

18. A message transmitted from a base station to a plurality of mobile stations in a wireless network providing broadcast multicast services, wherein said message includes one or more fields providing configuration information associated with multicast services deployed on each frequency in said coverage area of said base station and a flag indicating whether said message includes all of said one or more fields or only select ones of said one or more fields having updated configuration information, and wherein said message includes only said select fields having updated information when said flag is set to a first value.

19. The message as set forth in claim 18 wherein message further includes a message sequence field indicating a number of said message in a sequence of messages, said message sequence field being incremented when said message includes said updated information.

20. The message as set forth in claim 19 wherein said message sequence field is not incremented when said message does not include said updated information.

21. The message as set forth in claim 18 wherein said message includes all of said one or more fields when said flag is set to a second value.

22. The message as set forth in claim 18 wherein said configuration information further includes configuration information associated with multicast services deployed on each frequency in a coverage area of at least one neighboring base station.

23. The message as set forth in claim 18, wherein said message is a broadcast service parameters message transmitted on a paging channel.

24. A method of reducing the loading on a paging channel of a base station providing broadcast multicast services to a plurality of mobile stations in a coverage area of said base station within a wireless network, the method comprising the steps of:
   setting a value of a flag of a broadcast service parameters message, the broadcast service parameters message capable of providing information to the mobile stations in one or more fields;
   including only select ones of the one or more fields in the broadcast service parameters message based on the value of the flag and including only said select fields having updated information when the flag is set to a first value; and
   transmitting the broadcast service parameters message to the mobile stations on the paging channel.

25. The method as set forth in claim 24 further comprising the step of incrementing a message sequence field indicating a number of the broadcast service parameters message in a sequence of broadcast service parameters messages when the broadcast service parameters message includes updated information.

26. The method as set forth in claim 25 further comprising the step of maintaining a current value of the message sequence field when the broadcast service parameters message does not include updated information.

27. The method as set forth in claim 24 wherein step of including further comprises the step of including all of the one or more fields in the broadcast service parameters message when the flag is set to a second value.

28. The method as set forth in claim 24, wherein said step of setting further comprises the step of setting the value of the flag based on a number of new broadcast multicast service registrations recorded since the transmission of a previous broadcast service parameters message.

29. The method as set forth in claim 24, wherein said step of setting further comprises the step of setting the value of the flag based on a timer, the flag being set to a first value upon initialization of the timer and to a second value upon expiration of the timer.

30. The method as set forth in claim 24, wherein said step of setting further comprises the step of setting the value of the flag based on an amount of updated information received by the base station since the transmission of a previous broadcast service parameters message.

* * * * *